United States Patent [19]

Bellemare

[11] Patent Number: 4,491,963
[45] Date of Patent: Jan. 1, 1985

[54] CORRECTION OF IMAGING IMPERFECTIONS

[75] Inventor: Richard A. Bellemare, Oakville, Conn.

[73] Assignee: Pitney Bowes Inc., Stamford, Conn.

[21] Appl. No.: 408,963

[22] Filed: Aug. 17, 1982

[51] Int. Cl.³ .............................................. G06K 9/38
[52] U.S. Cl. ...................................... 382/53; 358/282
[58] Field of Search .................... 382/50–54; 358/282, 284; 355/14 E, 14 TR; 307/351, 356, 358

[56] References Cited

U.S. PATENT DOCUMENTS

| | | |
|---|---|---|
| 4,003,021 | 1/1977 | Sasaki et al. .......................... 382/53 |
| 4,132,977 | 1/1979 | Nagano ................................ 382/53 |
| 4,329,717 | 5/1982 | Logie et al. ......................... 382/53 |
| 4,442,544 | 4/1984 | Moreland et al. ................... 382/53 |

Primary Examiner—Leo H. Boudreau
Attorney, Agent, or Firm—Peter Vrahotes; Albert W. Scribner; William D. Soltow, Jr.

[57] ABSTRACT

A system is provided for automatically correcting imaging irregularities in a document scanner which uses an electronic imaging detector. This system avoids the need of expensive correction methods and is accomplished through an electronic system whereby feedback is provided so that corrections may be made in the output to compensate for the irregularities in the system.

1 Claim, 4 Drawing Figures

CORRECTION OF IMAGING IMPERFECTIONS

BACKGROUND OF THE INVENTION

In the field of imaging, application of fiber optics is coming more into use. Such fiber optics may be used in a system for scanning a document to produce signals representative of the images, such as characters and pictures that are on the document. As with any other system, a fiber optic imaging system contains inefficiencies or imperfections for which corrections should be made in order to obtain a uniform output. Unfortunately, correcting for these deficiencies generally tends to be an expensive undertaking. Such correction ordinarily involves calibrating the components of a system to assure they meet pre-determined tolerances. It obviously would be desirable to have a system that corrects for the imperfections in a fiber optic array system that is not expensive, but is dependable and reliable.

SUMMARY OF THE INVENTION

Imperfection compensation in an optical system is made by an electronic system wherein light signals emitted by the optical system are first converted to serial video signals. The light is first directed across a standard white surface and reflected upon a device that converts the light signals to video signals. These intial video signals are supplied to a memory and a microcomputer controls the trafficing of the signals to send them to digital-to-analog converters so that a correction signal is supplied back to the analog-to-digital converter. The output from the digital-to-analog converter would be an inverse of the standard pattern so that self-compensation takes place based upon the original signal and the inverse thereof.

DETAILED DESCRIPTION OF THE PREFERRED EMBODIMENT

Figure 1:
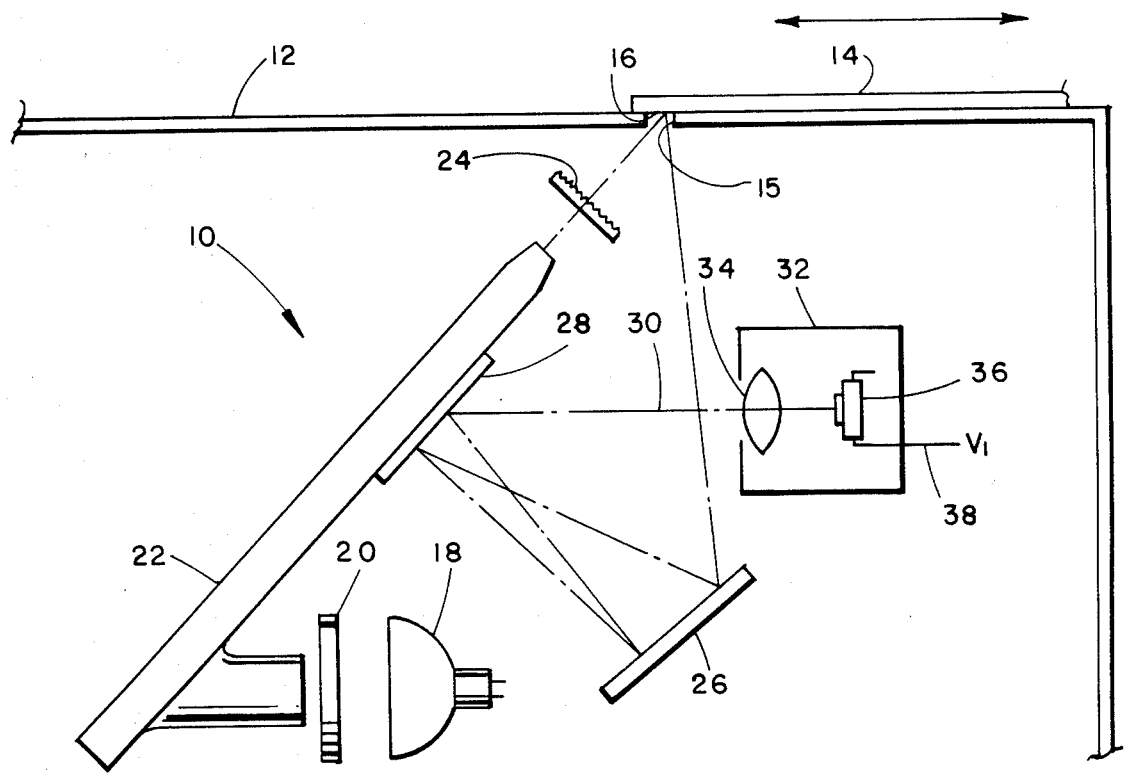
FIG. 1 shows the scanning station of a copier apparatus that utilizes the instant invention.

Referring to FIG. 1, a scanning station of a reproducing apparatus is shown generally at 10 and includes a housing 12, only a portion of which is shown. A carriage 14 is disposed upon the housing 12 and is operative to be reciprocated across an opening 15 in the housing (such reciprocating means not being shown). The carriage 14 has a reference area 16 at one end thereof which has a high white level. Located below the carriage within the housing 12 is a lamp 18 and a mirror 20 which addresses the lamp. Preferably, the mirror 20 is a hot mirror that allows the light to pass therethrough but reflects heat. A fiber optic array 22 is in line with the lamp 18 and mirror 20, the array containing a plurality of fiber optic bundles received with a casing. A concentrating lens 24, such as a Frenel lens, is located between the fiber optic array 22 and the carriage 14. A mirror 26 is located below the opening 15 in a position so as to receive light reflected from the carriage 14 and direct it towards the fiber optic array 22. Another mirror 28 is located on the fiber optic array 22 and together with the mirror 26 forms a light path 30 as shown in FIG. 1. Positioned on the light path 30, is a camera 32 made up of an imaging lens 34 and a charge coupled device (CCD) 36. The charge couple device 36 has an output 38 that would carry a serial video signal illustrated as a voltage $V_1$.

Figure 2:
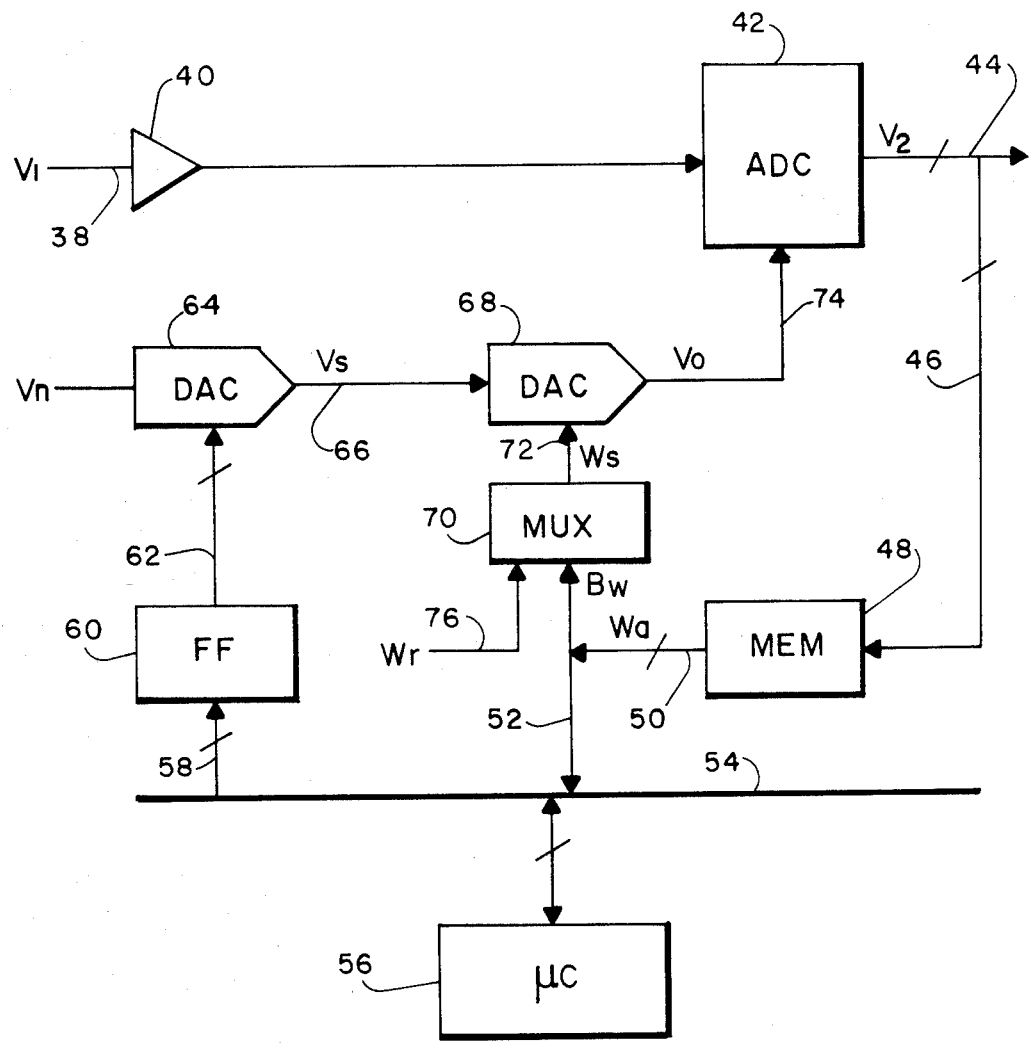
FIG. 2 shows a circuit for correcting the irregularities in the optical system shown in FIG. 1.

Referring now to FIG. 2, the output from the CCD 36 is connected to an amplifier 40 which in turn is connected to an analog-to-digital converter (ADC) 42. The ADC 42 has an output 44 therefrom and a lead 46 is connected to the output 44 to connect a two-dimensional memory 48 to the ADC 42. The memory 48 has an output 50 therefrom that contacts a lead 52. A bus 54 is connected to the lead 52. A microcomputer 56 is connected to the bus 54 and a lead 58 extends from the bus to a flip-flop 60. Another lead 62 connects a digital-to-analog converter (DAC) 64 to the flip flop 60 which converter receives a standard voltage $V_n$. A lead 66 connects the DAC 64 to another digital-to-analog converter (DAC) 68 which is connected also to a multiplexer 70 through a lead 72 upon which an output $W_s$ from the multiplexer is carried. The output 74 of the DAC 68 is connected to the ADC 42. The multiplexer is also connected to the bus 54 through the leads 52 and receives a reference digital word $W_r$, which our case is all ones, through lines 76.

In operation, the microcomputer 56 initializes the digital-to-analog converter 64 by writing all ones to the converter 64 through the flip-flops 60 and initializes the converter 68 by writing all ones by the standard word $W_r$ through the multiplexer 70. The white reference 16 is illuminated by the fiber optics 22 when the apparatus first starts to operate, i.e., upon closing the copy switch of the copier in which the instant invention would be used. The carriage 14 will move to the left as seen in FIG. 1 and a light path will be directed from the reference plate 16 to the CCD 36 as indicated by the light path 30. The CCD 36 will convert the light energy incident thereon into serial video signals $V_1$ which will be output on the line 38 from the CCD 36. The reference area 16 is horizontally scanned and the resulting serial video signal is passed to the analog input of the analog-to-digital converter 42 through the buffer amplifier 40.

Figure 3:
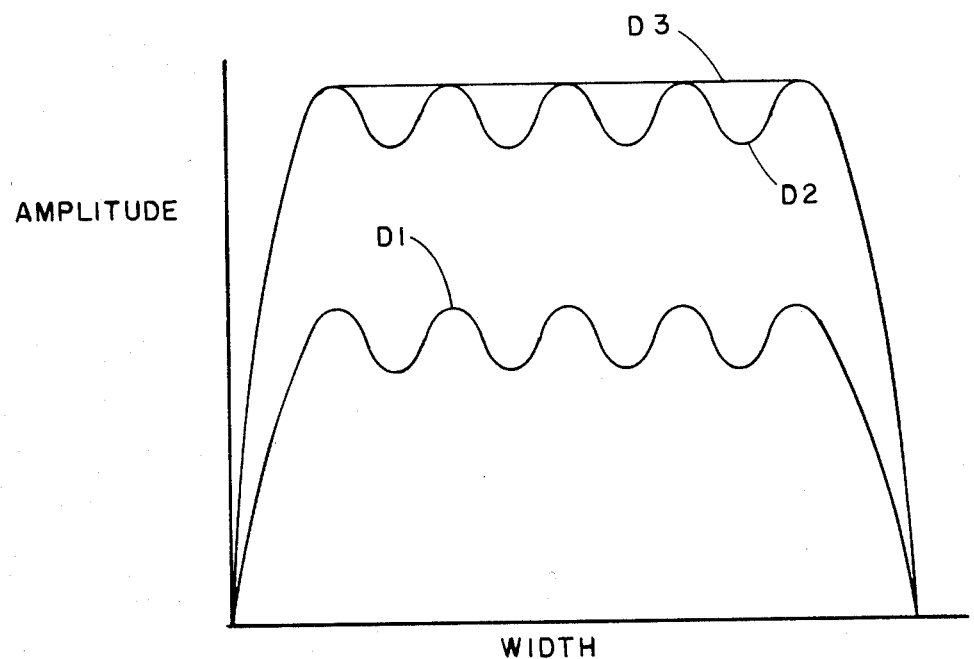
FIG. 3 shows a plot of waveforms assumed by the video signal output.

The now converted digitized serial video signals on lines 44 are in the form of words $V_2$ which are synchronously stored in the memory 48 to create a "snap-shot" of the scanned reference area 16. This snap-shot is represented in FIG. 3 by graph $D_1$ as an analog representation of the digital snap-shot. The height of this curve will be less than what would be obtained by a relatively pure white level which is represented by $D_3$. The curve $D_1$ not only has a lower amplitude but also has an irregular, undulated plateau. The output from the ADC 42 is in terms of an eight bit binary code so that the maximum value of a word is 255. More specifically, 255 represents the bit capacity of an eight bit code.

Figure 4:
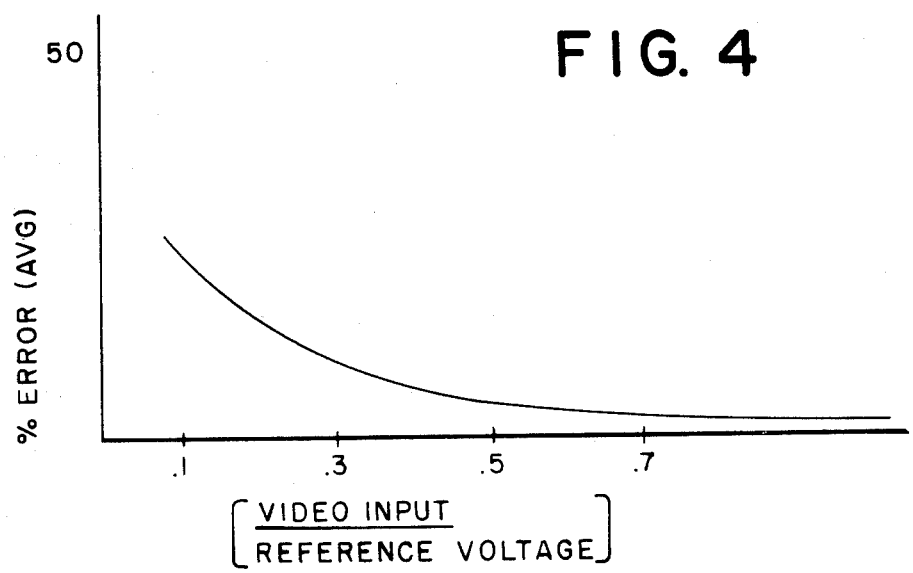
FIG. 4 shows a graph representing error correction of the video input.

The microcomputer 56 searches the memory 48 to find the highest value of video $W_A$ and writes it to the converter 64 through the flip-flops 60 causing subsequently received digitized video signals to be gain controlled, similar to an analog peak detect AGC. The primary reason for gain controlling is to minimize correction errors as shown in FIG. 4. The output of DAC 64 is a voltage $V_S$ equal to $(V_N/225) \times W_A$, where $V_N$ is the voltage received by the DAC 64, thereby causing a gain controlling signal to be sent to the DAC 68. Upon the DAC 68 receiving the voltage $V_s$, a standard word $W_S$ will also be received by way of the multiplexer 70. The DAC 68 will perform the computation of $V_o=(W_S/255)\times V_S$. Since $W_S$ is all ones, it will equal 255 therefore $V_o=V_S$. This signal $V_o$ will then be sent to the ADC 42. When this signal $V_o$ is supplied to the ADC 42 it will cause the output $V_2$ to assume the shape $D_2$ shown in FIG. 3, which is an analog representation of the digital word value. More specifically, the amplitude of the signal will be lifted to the level that would be achieved by the relatively pure white background were it not for imperfections in the system.

The microcomputer 56 then causes another "snapshot" to be taken for subsequent use in correcting the peak amplitude of the white reference. The multiplexer 70 is then switched to receive the memory output 50 and the memory 48 is then serially outputted in phase and synchronism with the horizontal digitized video signal during document scanning, thereby modulating the reference voltage $V_o$ and correcting the imaging imperfections at the output of the analog-to-digital converter.

The thus described system is one in which the scanning system's irregularities are used to modify the reference voltage $V_o$ so that the irregularities are used to correct themselves and will result in an output resulting from a document being scanned that is at an acceptable level for purposes of further processing. More specifically, the output on line 44 may be sent to a data bus of an electronic printer such as one that uses a laser or light emitting diode for the purpose of selectively discharging a charged photoreceptor as is known in the art.

What is claimed is:

1. A system for compensating for imperfections in an optical apparatus that scans a document for the purpose of producing signals representative of printed information, comprising:

converter means for converting light signals into a serial video signal, scanning means for directing light across a document in successive scans, means for directing light from said document to said converter means, an analog-to-digital converter connected to said light converter means to output binary words $V_2$ that are a representation of the document, the highest value of the binary word being designated as $W_a$, memory means connected to the output of the analog-to-digital converter for receiving and storing all values of $V_2$, a microcomputer connected to said memory means, said microcomputer being operative to search said memory means and cause said value $W_a$ to be written out of said memory means, multiplexer means connected to said memory means and to said microcomputer to receive said value $W_a$ written out of said memory means, reference means for supplying a word $W_r$ to said multiplexer means, said microcomputer causing a value $W_s$ to be written out of said multiplexer means, where $W_s=W_a$ on a first scanning by said scanning means and $W_s=W_r$ upon a second scanning by said scanning means, a first digital-to-analog converter connected to said microcomputer and to said memory means for receiving said value $W_a$ when written out of said memory means, voltage means connected to said first digital-to-analog converter for supplying a voltage $V_n$, said first digital-to-analog converter computing and writing out an analog signal $V_s$, where $V_s=(V_n/N)\times W_a$ where N represents the bit capacity of the system, a second digital-to-analog converter connected to said first digital-to-analog converter for receiving said signal $V_s$, connected to said multiplexer means for receiving said value $W_s$ and connected to said analog-to-digital converter for transmitting a signal $V_o$ to said analog-to-digital converter where $V_o=(W_s/N)\times V$, said analog-to-digital converter receiving said $V_o$ signal for modifying its output $V_2$.

* * * * *